Feb. 17, 1970  B. BOTHE  3,495,329
COMBINED SAW AND SICKLE
Filed Dec. 6, 1967
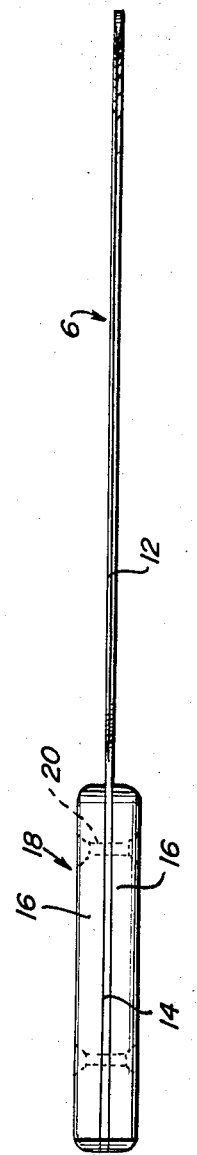
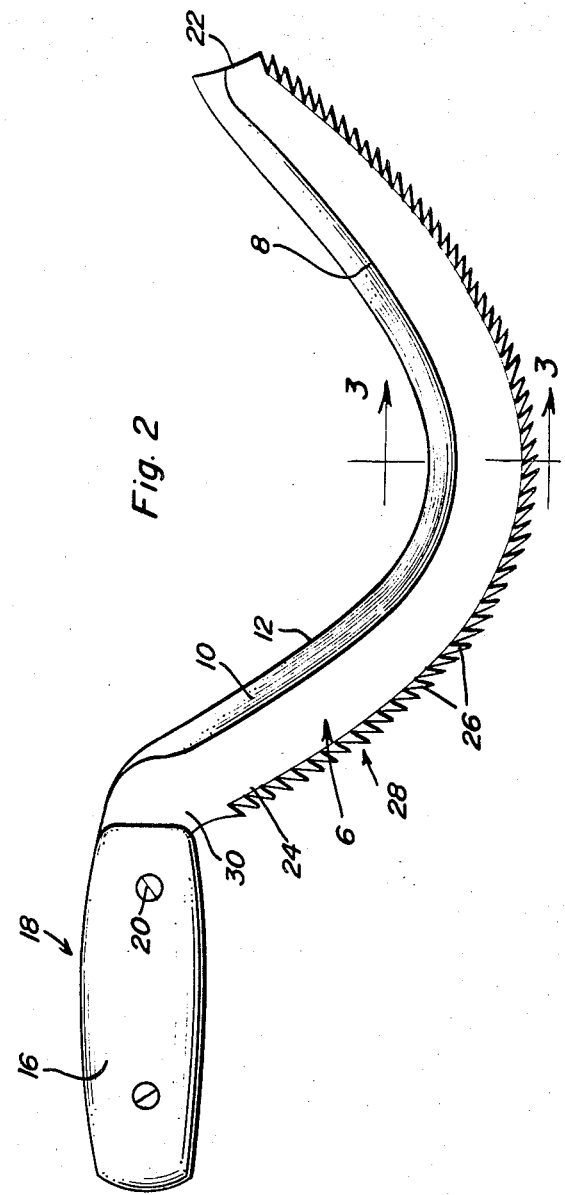
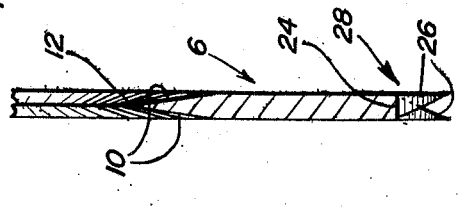
Benno Bothe
INVENTOR.
BY *Clarence A. O'Brien*
*and Harvey B. Jackson*
Attorneys

United States Patent Office 3,495,329
Patented Feb. 17, 1970

3,495,329
COMBINED SAW AND SICKLE
Benno Bothe, 1508 Highway 46 South,
New Braunfels, Tex. 78130
Filed Dec. 6, 1967, Ser. No. 688,532
Int. Cl. B25f 1/00
U.S. Cl. 30—144                          1 Claim

ABSTRACT OF THE DISCLOSURE

An implement which is usable as a (1) sickle or (2) a saw and comprising an arcuately curved flat-faced blade with a handgrip at one end. One edge of the blade is fashioned into a sickle. The other edge is toothed from end to end and provides a saw. This single but dual purpose implement is adapted for use by farmers, do-it-yourself homeworkers, carpenters, electricians, plumbers and others.

---

This invention relates to manually usable compound tools and combination implements and has to do with a sickle which is unique in that the blade is provided along one lengthwise edge with the usual cutting edge and along its other lengthwise edge with saw teeth, whereby to provide a unique two-in-one tool.

The broad idea of providing a sickle blade with a cutting edge and saw teeth for selective use is not new as can be ascertained by referring to the combination grass hook, corn knife and pruning saw disclosed in the patent to A. A. Bates 1,021,444. Accordingly, an objective in the instant matter is to provide a similar but structurally and functionally distinct adaptation which will well serve the special purposes for which it has been devised and effectually used.

Briefly, the steel blade has the usual straight shank and wooden handgrip at one end. The concave lengthwise forward edge is suitably sharpened and provides a sickle. The convex rearward edge is novel in that it is provided from the handle-equipped end to the top of the free end with two rows of teeth similar to those used on cross-cut and rip saws and capable of service similar to wood saws but distinguishable in that the saw blade is arcuately curved instead of straight.

These together with other objects and advantages which will become subsequently apparent reside in the details of construction and operation is more fully hereinafter described and claimed, reference being had to the accompanying drawings forming a part hereof, wherein like numerals refer to like parts throughout, and in which:

FIG. 1 is a view in front edge elevation of a combined saw and sickle constructed in accordance with the present invention.

FIG. 2 is a side elevational view of the same, and

FIG. 3 is an enlarged cross-section taken on the plane of the section line 3—3 of FIG. 2.

Referring now to the views of the drawing, the rigid stainless steel or equivalent blade is denoted by the numeral 6. This blade is comparable, as will be evident from the showing in FIG. 1, with a conventional arcuately curved sickle blade. Accordingly, it is provided on opposite sides with flat faces. The forward concave edge 8 (FIG. 2) is provided with converging bevels 10 as shown in FIG. 3 to define a knife-like cutting edge 12. The usual tang or shank at the operating end of the blade is denoted at 14 (FIG. 1) and is interposed between the confronting faces of wooden or equivalent components 16 defining a handle or handgrip 18. The grip sections are riveted or otherwise securely mounted as at 20 on the shank. This handle-equipped end of the blade is spaced a requisite distance from the free end 22 of the blade as shown in FIG. 2. The entire convex edge, denoted generally at 24 and constituting the rearward edge of the blade, is provided with rows of substantially triangulate properly pointed teeth 26 which constitute a general utility saw denoted generally by the numeral 28. It should be noted that the saw teeth 26 range or extend from the end portion 30 adjacent the handle to the tip or freee end 22.

With this tool or implement the user (a farmer, carpenter, electrician, plumber, mechanic or other person) has at this disposal a multipurpose implement which, broadly speaking, provides a sickle and also a general utility saw. However, and as is the case with multipurpose tools and implements, the user, resorting to trial and error experimentations, will discover many ways in which the implement can and should be effectually used. It is reiterated therefore that the implement will well serve the many uses to which it will be put.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An implement for use by farmers, do-it-yourself homeworkers and others, said implement being of a dual-purpose type and designed and adapted for use by hand and comprising an elongated rigid arcuate flat-faced blade having longitudinal forward and rearward edges, said forward edge being concave, sharpened and providing a cutting edge, said cutting edge extending uninterruptedly from one end to the other end of the longitudinal forward edge and being adapted for use as a reaping sickle, said rearward edge being convex and being provided with sharpened saw teeth also extending uninterruptedly from one end to the other end of said rearward edge whereby a convexly curved saw blade edge is formed along said rearward edge, said teeth being arranged in speced parallel rows, being individual and capable of being filed, sharpened and set for use with a saw setting tool and cooperating in providing a general utility wood saw, said blade being provided at one end with a tang extending substantially in the longitudinal direction of the blade and at a substantial angle thereto, said tang being provided on opposite lengthwise surfaces with securely attached grip members, said grip members and intervening tang providing a handle.

References Cited

UNITED STATES PATENTS

| 1,021,444 | 3/1912 | Bates | 30—144 X |
| 1,935,149 | 11/1933 | Elvin | 30—144 X |
| 2,305,476 | 12/1942 | Johnson | 30—144 |

FOREIGN PATENTS

| 1,032,591 | 6/1958 | Germany. |

G. L. WEIDENFELD, Primary Examiner

U.S. Cl. X.R.

30—166, 145—31; 7—13